No. 726,091. PATENTED APR. 21, 1903.
C. A. McKERROW.
PROCESS OF REVIVING HYDRATED SILICATES.
APPLICATION FILED JAN. 4, 1902.
NO MODEL.
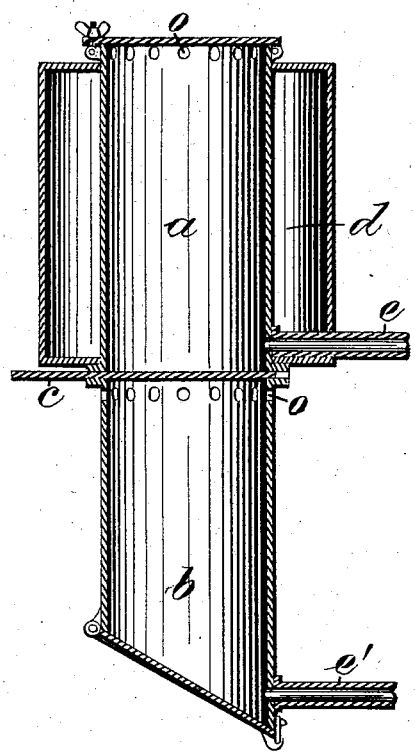

UNITED STATES PATENT OFFICE.

CHARLES A. McKERROW, OF MANCHESTER, ENGLAND.

PROCESS OF REVIVING HYDRATED SILICATES.

SPECIFICATION forming part of Letters Patent No. 726,091, dated April 21, 1903.

Application filed January 4, 1902. Serial No. 88,438. (No specimens.)

*To all whom it may concern:*

Be it known that I, CHARLES ALEXANDER MCKERROW, a subject of the King of Great Britain, residing at Manchester, in the county of Lancaster, England, have invented new and useful Improvements in the Preparation and Revivification of Hydrated Silicates, of which the following is a specification.

Fullers' earth is used in processes for the purification, refining, and decolorization of oils, fats, and greases of animal, vegetable, and mineral origin and thereafter is a waste substance which is not at present available for reuse in these processes. There are various natural clays, natural and artificial silicates, and silicious matters which can also be used in the processes for the same purpose; but hitherto many of these substances have not been successfully used on a commercial scale.

I have found that the clays, silicates, and silicious matters suitable for the above-named processes belong to the margarophyllite section of hydrous silicates, which includes bisilicates, unisilicates, and subsilicates as classified in Dana's *Text-Book of Mineralogy*, twelfth edition. (J. Wliey & Sons, New York, United States of America.) These often have the compactness of clay or wax and especially in the powdered form are greasy to the feel. Fullers' earth, otherwise known as "smectite," is included in this section. All of these silicates are essentially hydrous or hydrated silicates of calcium, magnesium, aluminium, iron, potassium, or sodium and almost invariably a combination or admixture of two or more of them. As examples of the clays, silicates, and silicious substances which may be used for the purpose of my invention are the fullers' earths bearing the names "Somerset blue," "Surrey blue," "Surrey yellow," "Ohio," "South Dakota," "Ocala," "Custer," and "glacialite," the natural clays known as "alum-clay," "china-clay," "pipe-clay," and "fire-clay," the natural silicates known as "kaolin," "pyrophyllite," "talc," "sepiolite," "serpentine," "pinite," "fahlunite," "margarodite," "damourite," "paragonite," and "hisingerite." Among commercial silicious substances occurring as by-products which are suitable for my process are those which consist mainly of analogous hydrated silicates.

Some natural clays, natural silicates, and silicious substances are found to lack to a greater or less degree the refining properties possessed by fullers' earth and are apt to impart objectionable properties to the oils, greases, and similar matters in the treatment of which they may be used. Some of the grades of fullers' earth also are deficient in the requisite refining properties. I find it to be advantageous to use those of the named or similar substances which contain a high percentage of silica, since those containing a low percentage are apt to be too soft for economical use. I find also that some of these substances when subjected to the action of steam in a heated vessel evolve gases, among which I have recognized in some cases hydrogen sulfid and in others sulfur dioxid.

One of the objects of my invention is to remove deleterious and objectionable matters by decomposition of sulfur compounds and by destruction of organic matters when present. Other objects are to greatly improve the quality of unused fullers' earth, to impart to the hereinbefore-described natural and artificial silicates and silicious matters or substances the desired refining and other properties, and to revivify spent fullers' earth and the above-described natural and artificial silicates and silicious matters after previous use or when containing fat, oil, or grease or other organic matter, so as to render them available with the greatest advantage for the purification, refining, decolorization of oils, fats, and greases of animal, vegetable, or mineral origin.

In carrying out my invention I may use any suitable closed vessel which can be externally heated and through which a current of steam can be passed. The clay, the natural or artificial silicate, or the silicious matter to be treated is introduced in the fresh or spent condition into the vessel, which is then closed. The method of procedure varies according to the nature of the material operated on and according also to its hygroscopic condition. When the material, in lump or powdered form, contains little or no hygroscopic water, apart from its water of hydration or combination, steam is passed into the vessel as a preliminary measure, so as to thoroughly dampen it. If, on the contrary, the material contains sufficient moisture to prevent decomposition of the hydrated silicate in the subsequent process of heating, this preliminary steaming or damping is not necessary. The contents of the closed vessel being in the desired preliminary hygroscopic condition, steam is admitted or its admission is continued and its entrance or exit is so controlled that a gentle continuous escape is maintained. Simultaneously with this stage of the treatment the vessel is externally heated to such a temperature as will insure the decomposition of any organic matter or sulfur compounds contained in the substance under treatment. Ordinarily the steam within the vessel will be hotter at the outlet end than at the inlet end, so that its condition is not homogeneous throughout. To avoid this result, I may when required superheat the steam before its admission to the vessel. Hydrogen sulfid, sulfur dioxid, or other gaseous products will issue with the escaping steam. When these products cease to escape and a cooled sample of the treated material by a short test appears to give the results required from it, the superheating of the steam is discontinued, the external source of heat is withdrawn, and the material is allowed to remain in the continued presence of the steam until the temperature of the material is about 212° Fahrenheit. The material is now found to have retained water of combination and hydration and yet to contain little or no hygroscopic moisture and is handled in the usual manner. In the case of spent material containing fatty matters or other organic substances the gases and vapors given off during the treatment may be collected and utilized as may be determined by their composition. The treated material possesses enhanced purifying, decolorizing, and refining properties and imparts no objectionable qualities to the oil or other matters treated by it, while after use it can be revivified by a repetition of the operation.

In the annexed drawing, which represents diagrammatically a vertical section of the apparatus, $a$ and $b$ are two coaxial cylindrical vessels normally separated by a slide $c$. The upper vessel is surrounded by a jacket or chamber $d$, which can be heated by fire, hot air, or otherwise. There is provision for supplying steam to each chamber, as at $e\ e'$, separately. Waste steam and products can escape through openings $o$, made at the upper end of each chamber or vessel $a\ b$. The material to be treated is supplied to the upper chamber $a$, where it is heated and steamed simultaneously. When this part of the process is completed, the slide is withdrawn and the heated material falls into the lower chamber, where it is again subjected to the action of live steam until the temperature falls to about 212° Fahrenheit, when the material is withdrawn. While the cooling is taking place in the lower vessel, a second charge is being heated and steamed in the upper vessel.

What I claim, and what I desire to secure by Letters Patent, is—

1. The process for the preparation and revivification of a hydrous silicate which consists in subjecting it in a closed vessel to the action of steam so as to dampen the silicate, thereafter externally heating the vessel and its contents while the action of steam is continued until deleterious organic matters and sulfur compounds are decomposed, and finally withdrawing the external source of heat and passing steam through the contents of the vessel until the temperature of the silicate is about 212° Fahrenheit, substantially as set forth.

2. The process for the preparation and revivification of a hydrous silicate which consists in subjecting it in a closed vessel to the action of a current of steam and to an externally-applied source of heat until deleterious organic matters and sulfur compounds are decomposed and thereafter withdrawing the external source of heat and passing steam through the contents of the vessel until the temperature of the silicate is about 212° Fahrenheit, substantially as set forth.

In testimony whereof I have signed this specification in the presence of two subscribing witnesses.

CHARLES A. McKERROW.

Witnesses:
WILLIAM E. HEYS,
ARTHUR MILLWARD.